No. 897,617. PATENTED SEPT. 1, 1908.
M. L. GROVE.
AUTOMATIC VALVE.
APPLICATION FILED APR. 10, 1907.
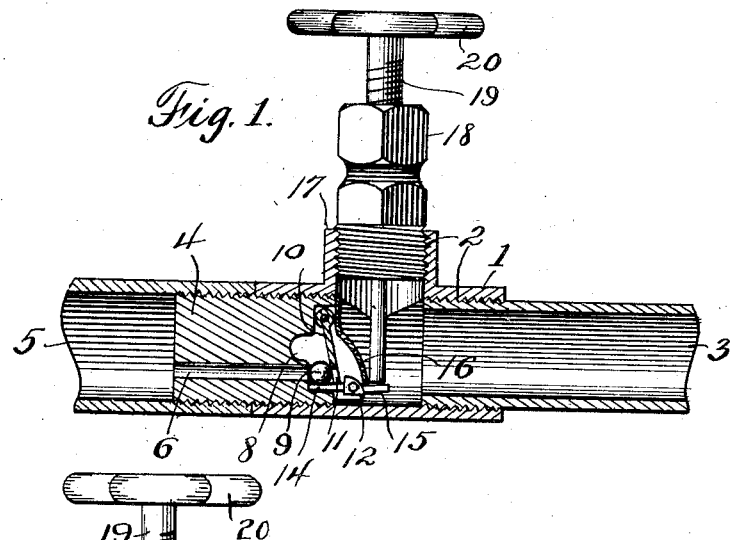
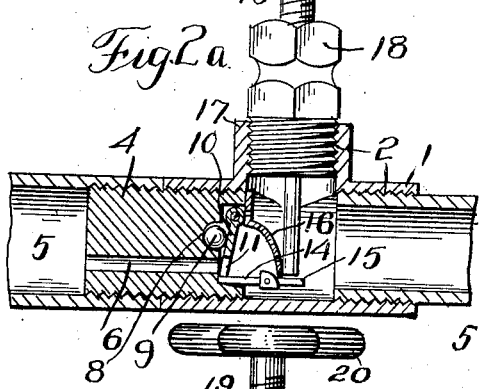
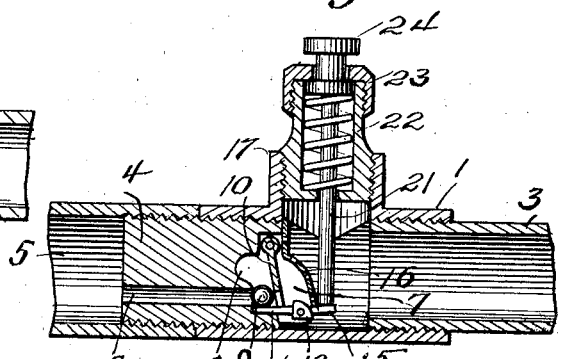
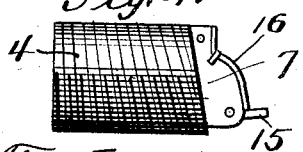
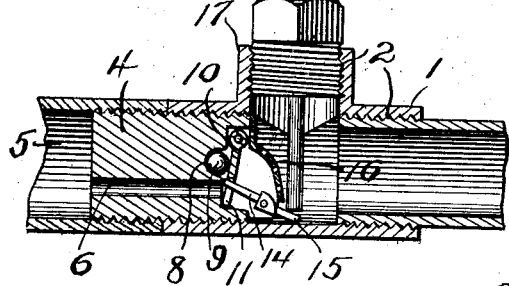
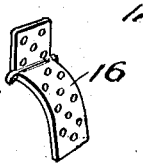
Witnesses
Samuel Payne
M. E. Lowry
Inventor
M. L. Grove
By H. C. Everett
Attorneys

UNITED STATES PATENT OFFICE.

MARTIN L. GROVE, OF TYLERSBURG, PENNSYLVANIA, ASSIGNOR OF ONE-THIRD TO W. A. WRAY, OF TYLERSBURG, PENNSYLVANIA, AND ONE-THIRD TO N. F. HOOVER, OF MARIENVILLE, PENNSYLVANIA.

AUTOMATIC VALVE.

No. 897,617.       Specification of Letters Patent.       Patented Sept. 1, 1908.

Application filed April 10, 1907. Serial No. 367,408.

*To all whom it may concern:*

Be it known that I, MARTIN L. GROVE, a citizen of the United States of America, residing at Tylersburg, in the county of Clarion and State of Pennsylvania, have invented certain new and useful Improvements in Automatic Valves, of which the following is a specification, reference being had therein to the accompanying drawing.

This invention relates to valves, and the invention has for its object to provide an automatically actuated valve for gas supply pipes, wherein positive and reliable means are employed for closing the valve should the gas pressure decrease or the supply of gas be entirely shut off.

My invention aims to prevent the asphyxiation of persons within a compartment by the escape of gas which has been shut off and then turned on without the persons being aware of the fact. In this connection, my improved valve can be used for other purposes, but I have particularly designed the same for use in connection with gas supply pipes leading to burners either of stoves or lamps. To this end, I have constructed a valve wherein a spherical body or ball controls the passage of gas through the valve. In connection with the spherical body or ball, I employ pivoted levers and a valve stem whereby the body or ball can be locked in an elevated position to provide a continuous passage through the valve. I also employ a screen in the valve body for preventing flakes and solid matter from passing through the gas pipe to a burner.

The detail construction of my invention will be hereinafter more fully described and then specifically pointed out in the appended claims, and referring to the drawing forming part of this specification, like numerals of reference designate corresponding parts throughout the several views, in which:—

Figure 1 is a longitudinal sectional view of a valve constructed in accordance with my invention, illustrating the spherical body or valve in position to shut off the flow of gas, Fig. 2 is a similar view illustrating the spherical body or ball valve moved to position to open the passageway for the gas, and held in such position by the valve stem, Fig. 2ª is a view similar to Fig. 2, illustrating the valve stem in the elevated position, and the spherical body or valve resting in its seat where it is held by the pressure of gas passing through the valve body or casing, Fig. 3 is a longitudinal sectional view of the valve illustrating a modification of my invention, Fig. 4 is an elevation of the threaded plug used in connection with the valve, Fig. 5 is a perspective view of a fulcrumed lever constituting one of the parts of my invention, Fig. 6 is a perspective view of a pivoted plate used in connection with the valve, Fig. 7 is a perspective view of a perforated plate or screen comprising part of my invention.

To put my invention into practice, I construct my improved valve of a body 1 conforming to a T having interiorly arranged threads 2. In one end of the valve body is connected a gas supply pipe 3, while in the opposite end is secured a threaded plug 4, said plug connecting the outlet pipe 5 to the valve body. The plug 4 is provided near its lower edge with a longitudinally disposed bore 6 terminating in the recessed end 7 of said plug, said recessed end having a seat 8 formed therein for a spherical body or ball 9. In the recessed end of the plug 4 is pivotally mounted a plate 10 having a bifurcated end 11. In the recessed end 7 of the plug 4 is also fulcrumed a lever 12, the longer arm 14 of which extends through the bifurcated end 11 of the plate 10 and in close proximity to the end of the bore 6. The shorter arm 15 of the lever protrudes outwardly beneath a perforated plate or screen 16 secured over the bifurcated end 7 of the plug 4.

Threaded in the nipple 17 of the valve body 1 is a conventional form of housing and stuffing box 18 for an adjustable valve stem 19, said valve stem carrying a hand wheel or lever 20 whereby the valve stem can be rotated to engage the shorter arm 15 of the lever 12 and hold the longer arm in an elevated position, to support the spherical body or ball 9 above the inner end of the bore 6.

In Fig. 3 of the drawing, I have illustrated a slight modification of my invention, wherein the threaded stem 19 and the hand wheel 20 are dispensed with, and the spring supported rod 21 used, said rod being supported within a housing 22 carried by the nipple 17, and provided with a cap 23 to limit the downward movement of the head 24 of the rod 21. Assuming that there is a pressure of gas within the pipe 3, the stem 19 is turned down so as to engage the arm 15 and cause the lever 12 to elevate the spherical body or ball 9, until it passes above the lower edge of the valve seat 8, and, the pressure of the gas against plate 10 causes the ball or spherical body to be forced into the seat 8 in the position shown in Fig. 2 of the drawings, where it is retained by the plate 10, so long as the gas pressure remains normal. Should the gas pressure decrease materially, or entirely cease, the ball drops, the stem 19 having been previously elevated, and the valve seats in front of the passage way 6 and shuts off further flow of gas to the outlet pipe, should such flow again resume.

By lowering the valve stem 19 and permitting it to remain in the lowered position, the spherical body or ball can be maintained in an elevated position at all times whereby gas can freely pass through the valve body 1.

I do not care to confine myself to the specific arrangement of the various parts of my invention and such changes in the size, proportion and minor details of construction, as are permissible by the appended claims, may be resorted to without departing from the spirit and scope of the invention.

What I claim and desire to secure by Letters Patent, is:—

1. In a valve of the type described, a body, a plug threaded in said body and having a longitudinally disposed bore formed therein, one end of said plug being recessed to provide a seat, a plate pivotally mounted in the recessed end of said plug, a lever fulcrumed in the recessed end of said plug, a ball mounted in the recessed end of said plug, a perforated plate or screen mounted over the recessed end of said plug, and bearing against said ball, and a valve stem adjustably mounted in said body and adapted to engage said fulcrumed lever, substantially as described.

2. In a valve of the type described a body, a plug threaded therein and having a bore and provided at one end with a recess, a plate pivotally mounted in the recessed end of said plug, a lever fulcrumed in the recess in said plug, a spherical valve in the recessed end of the plug and adapted to close the end of said bore, and means carried by said body and engaging said lever for elevating said spherical valve.

3. In a valve of the type described a body, a plug threaded therein, said plug having a bore formed therein, a lever fulcrumed at one end of said plug, a spherical valve mounted in a recess in the end of said plug and adapted to close said bore, a perforated plate or screen mounted upon the end of said plug, and means adapted to engage said lever for normally holding said spherical valve in an elevated position.

4. A valve of the type described comprising a body, a plug threaded therein, said plug having a bore formed therein, a lever fulcrumed upon the inner end of said plug, a spherical valve in said plug and adapted to close said bore, and a valve stem carried by said body and adapted to engage said lever for holding said spherical valve in an elevated position.

5. A valve of the type described comprising a body, a plug threaded therein, said plug having a bore threaded therein, a lever fulcrumed upon the end of said plug, a valve in the plug and adapted to close the end of said bore, and means carried by said valve body and adapted to engage the end of said lever for holding said spherical body or ball in an elevated position.

In testimony whereof I affix my signature in the presence of two witnesses.

MARTIN L. GROVE.

Witnesses:
MAX H. SROLOVITZ,
SAMUEL PAYNE.